United States Patent
Ozbilgin

(10) Patent No.: US 10,094,933 B1
(45) Date of Patent: Oct. 9, 2018

(54) AUTOMATED VEHICLE GPS ACCURACY IMPROVEMENT USING V2V COMMUNICATIONS

(71) Applicant: Delphi Technologies, Inc., Troy, MI (US)

(72) Inventor: Guchan Ozbilgin, Pittsburgh, PA (US)

(73) Assignee: Delphi Technologies, Inc., Troy, MI (US)

( * ) Notice: Subject to any disclaimer, the term of this patent is extended or adjusted under 35 U.S.C. 154(b) by 5 days.

(21) Appl. No.: 15/467,707

(22) Filed: Mar. 23, 2017

(51) Int. Cl.
*G01S 19/40* (2010.01)
*G01S 19/21* (2010.01)
*G01S 19/05* (2010.01)

(52) U.S. Cl.
CPC .............. *G01S 19/40* (2013.01); *G01S 19/05* (2013.01); *G01S 19/215* (2013.01)

(58) Field of Classification Search
CPC ......... G01S 19/40; G01S 19/215; G01S 19/05
See application file for complete search history.

(56) References Cited

U.S. PATENT DOCUMENTS

| | | |
|---|---|---|
| 5,983,161 A | 11/1999 | Lemelson et al. |
| 2011/0080302 A1* | 4/2011 | Muthaiah ................ H04L 47/10 340/903 |
| 2014/0070980 A1 | 3/2014 | Park |
| 2014/0107890 A1 | 4/2014 | Funabashi |

OTHER PUBLICATIONS

European Extended Search Report in European Application No. 18161585, dated Aug. 29, 2018, 6 pages.

* cited by examiner

*Primary Examiner* — Yuen H Wong
(74) *Attorney, Agent, or Firm* — Fish & Richardson P.C.

(57) ABSTRACT

A navigation system for use on an automated vehicle includes a global-positioning-system-receiver (GPS-receiver), a vehicle-to-vehicle-transceiver (V2V-transceiver), an object-detector, and a controller. The GPS-receiver indicates a receiver-coordinate of a host-vehicle. The receiver-coordinate is characterized by a receiver-error. The V2V-transceiver receives a GPS-coordinate from each of a plurality of other-vehicles proximate to the host-vehicle. The object-detector determines a distance and a direction relative to the host-vehicle to each of the plurality of other-vehicles. The controller is in communication with the GPS-receiver, the V2V-transceiver, and the object-detector. The controller is configured to adjust each GPS-coordinate from each of the plurality of other-vehicles based on the distance and the direction and thereby provide a plurality of adjusted-GPS-coordinates that coincide with the host-vehicle, and combine the plurality of adjusted-GPS-coordinates with the receiver-coordinate to determine a host-coordinate that is characterized by a location-error less than the receiver-error.

2 Claims, 2 Drawing Sheets

AUTOMATED VEHICLE GPS ACCURACY IMPROVEMENT USING V2V COMMUNICATIONS

TECHNICAL FIELD OF INVENTION

This disclosure generally relates to a navigation system for use on an automated vehicle, and more particularly relates to a navigation system that combines a plurality of adjusted-GPS-coordinates from other-vehicles with a GPS-receiver-coordinate of a host-vehicle to determine a host-coordinate that has less location-error than using only the GPS-receiver-coordinate.

BACKGROUND OF INVENTION

It is known a global-positioning-system-receiver (GPS-receiver) that indicates a receiver-coordinate of a host-vehicle has a receiver-error. That is there is expected to be some error associated with the receiver-coordinate indicated by the GPS-receiver on the host-vehicle, and economical examples of GPS-receivers that are used on many vehicles may have more error than preferred, especially in situations the GPS-receiver is the sole means of determining the location of the host-vehicle on a roadway.

SUMMARY OF THE INVENTION

In accordance with one embodiment, a navigation system for use on an automated vehicle is provided. The system includes a global-positioning-system-receiver (GPS-receiver), a vehicle-to-vehicle-transceiver (V2V-transceiver), an object-detector, and a controller. The GPS-receiver indicates a receiver-coordinate of a host-vehicle. The receiver-coordinate is characterized by a receiver-error. The V2V-transceiver receives a GPS-coordinate from each of a plurality of other-vehicles proximate to the host-vehicle. The object-detector determines a distance and a direction relative to the host-vehicle to each of the plurality of other-vehicles. The controller is in communication with the GPS-receiver, the V2V-transceiver, and the object-detector. The controller is configured to adjust each GPS-coordinate from each of the plurality of other-vehicles based on the distance and the direction and thereby provide a plurality of adjusted-GPS-coordinates that coincide with the host-vehicle, and combine the plurality of adjusted-GPS-coordinates with the receiver-coordinate to determine a host-coordinate that is characterized by a location-error less than the receiver-error.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
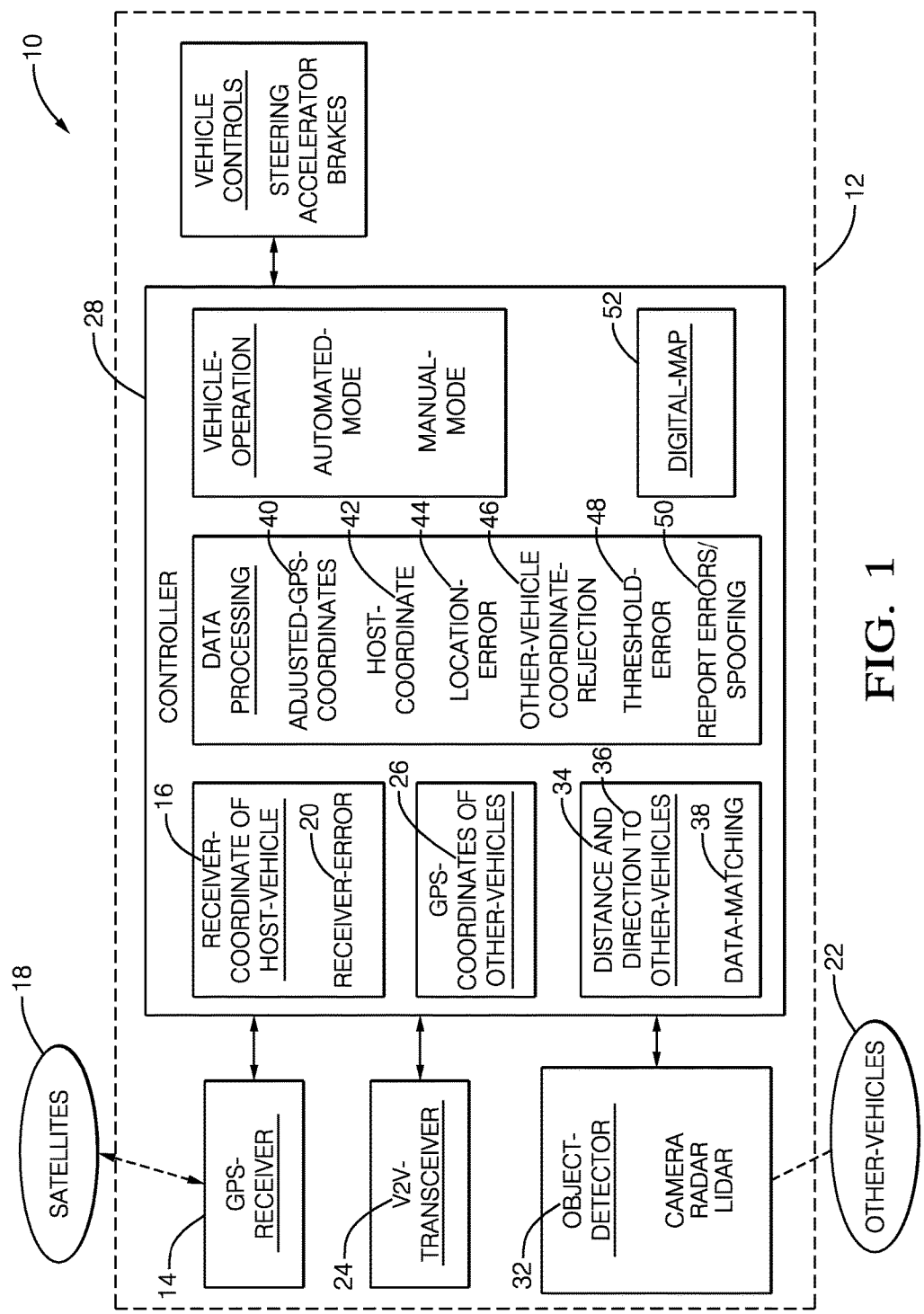
FIG. 1 is a diagram of a navigation system in accordance with one embodiment.

FIG. 1 illustrates a non-limiting example of a navigation system 10, hereafter referred to as the system 10, which is suitable for use on an automated vehicle, for example a host-vehicle 12. As used herein, the term automated vehicle may apply to instances when the host-vehicle 12 is being operated in an automated-mode, i.e. a fully autonomous mode, where a human-operator of the host-vehicle 12 may do little more than designate a destination in order to operate the host-vehicle 12. However, full automation is not a requirement. It is contemplated that the teachings presented herein are useful when the host-vehicle 12 is operated in a manual-mode where the degree or level of automation may be little more than providing an audible or visual warning to the human-operator who is generally in control of the steering, accelerator, and brakes of the host-vehicle 12. For example, the system 10 may merely assist the human-operator as needed to follow a route to a destination.

The system 10 includes a global-positioning-system-receiver 14 (GPS-receiver 14) that indicates a receiver-coordinate 16 of the host-vehicle 12 based on signals received from satellites 18. As will be recognized by those in the art, the receiver-coordinate 16 is characterized by a receiver-error 20. That is, there is expected to be some difference between the accuracy of a typical economical example of the GPS-receiver 14 that would likely be installed on a typical example of the host-vehicle 12, and the actual (i.e. zero error) coordinate that could be determined by using an expensive, high-accuracy (e.g. military grade or land-survey grade) example of a GPS-receiver. As will become apparent in the description that follows, the system 10 described herein overcomes this problem by taking into consideration coordinates of a plurality of other-vehicles 22 proximate to, i.e. in a line-of-site from the host-vehicle 12 and within some limited range, e.g. closer than one-hundred meters (100m).

Figure 2:
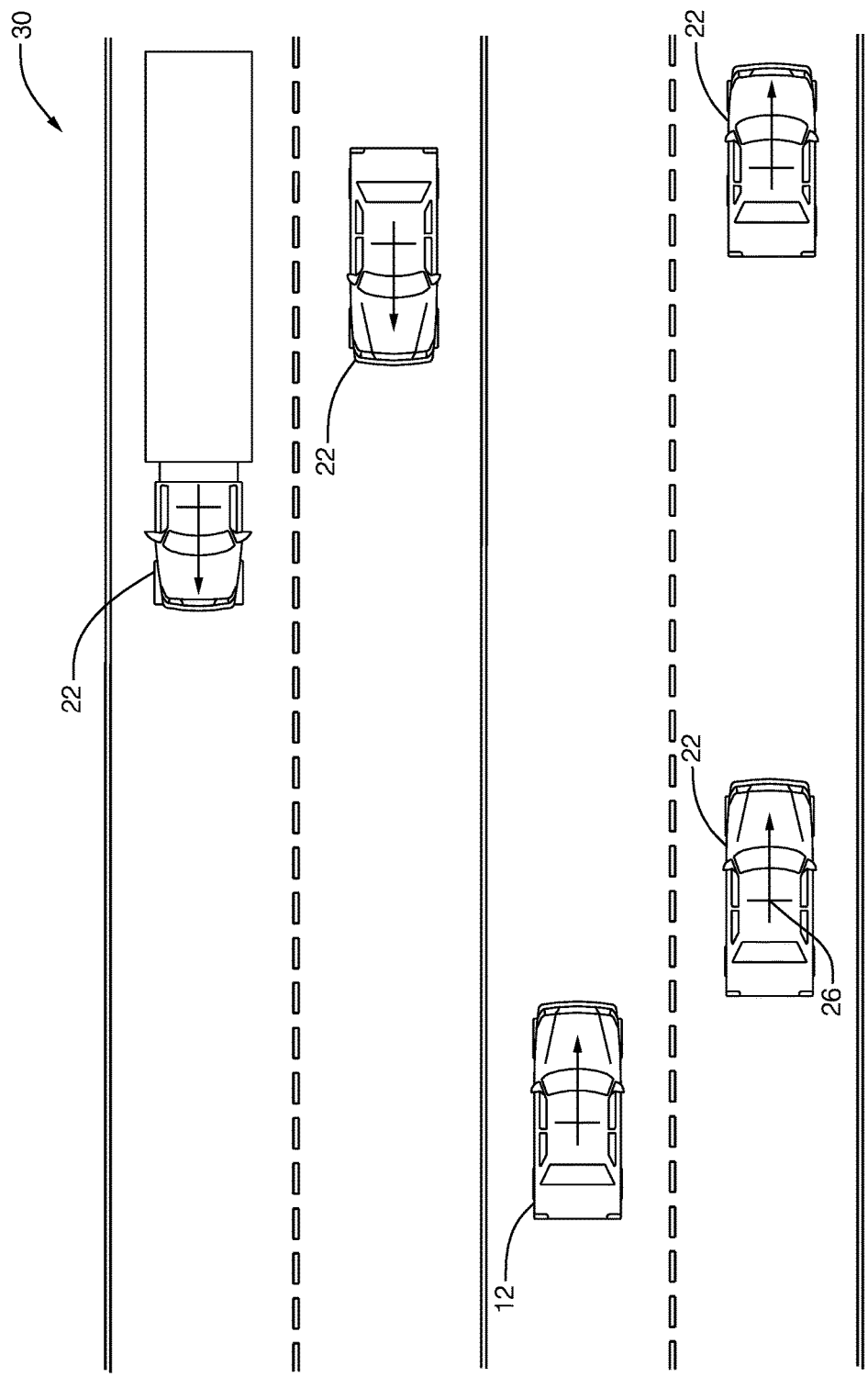
FIG. 2 is a traffic-scenario that may be encountered by the system of FIG. 1 in accordance with one embodiment.

FIG. 2 illustrates a non-limiting example of a traffic-scenario 30 where the host-vehicle 12 is proximate to the plurality of other-vehicles 22. The system 10 includes a vehicle-to-vehicle-transceiver 24, hereafter referred to as the V2V-transceiver 24, that receives a GPS-coordinate 26 from each of the plurality of other-vehicles 22 proximate to the host-vehicle 12. The location of the GPS-coordinate 26 is shown as being about in the center of the other-vehicles 22, but this is not a requirement. It is recognized that the GPS-coordinate 26 from each of the other-vehicles 22 will likely have an error similar in magnitude to the receiver-error 20. However, because the errors are expected to be randomized, those errors will tend to average towards zero as will be explained in more detail below.

The system 10 also includes an object-detector 32 that the system 10 uses to determine a distance 34 and a direction 36 relative to the host-vehicle 12 (i.e. from the host-vehicle 12) to each of the plurality of other-vehicles 22. The object-detector 32 includes, but is not limited to, any one or combination of a camera, a lidar, and a radar. If the object-detector 32 includes more than a single device, e.g. the combination of a camera and a radar, data-fusion techniques may be needed to combine the information from the separate devices to more accurately determine the distance 34 and the direction 36, as will be recognized by those in the art.

The system 10 also includes a controller 28 in communication with the GPS-receiver 14, the V2V-transceiver 24, and the object-detector 32. The communication may be by way of, but is not limited to, wires, fiber-optics, or wireless communications. The controller 28 may include a processor (not specifically shown) such as a microprocessor or other control circuitry such as analog and/or digital control circuitry including an application specific integrated circuit (ASIC) for processing data as should be evident to those in the art. The controller 28 may include memory (not specifically shown), including non-volatile memory, such as electrically erasable programmable read-only memory (EEPROM) for storing one or more routines, thresholds, and captured data. The one or more routines may be executed by the processor to perform steps for reducing the effects of the receiver-error 20.

To reduce the receiver-error 20, the controller 28 is programmed or configured to first perform data-matching 38 of the GPS-coordinates 26 received by the V2V-transceiver 24 to the distance 34 and the direction 36 indicated by the object-detector. That is, each instance of the other-vehicles 22 must be matched to each instance of the GPS-coordinates 26. The controller 28 then adjusts each instance of the GPS-coordinate 26 from each of the plurality of other-vehicles 22 based on the distance 34 and the direction 36, and thereby provide a plurality of adjusted-GPS-coordinates 40 that coincide with the host-vehicle 12. That is, the distance 34 and the direction 36 to each instance of the other-vehicles 22 is effectively subtracted from the GPS-coordinates 26 from each of the other-vehicles 22 to align or compensate the position of each of the other-vehicles 22 relative to the host-vehicle. As a result, the adjusted-GPS-coordinates are expected to be similar or almost equal to the receiver-coordinate 16, where the difference is expected to be primarily due to the receiver-error 20 and the errors of the GPS-receivers in the other-vehicles 22.

The controller 28 then combines the plurality of adjusted-GPS-coordinates 40 with the receiver-coordinate 16 to determine a host-coordinate 42 that is characterized by a location-error 44 less than the receiver-error 20. The combining of the plurality of adjusted-GPS-coordinates 40 with the receiver-coordinate 16 may be a simple averaging of the adjusted-GPS-coordinates 40 with the receiver-coordinate 16, or may be a weighted average where the receiver-coordinate 16 may be given more weight than any instance of the adjusted-GPS-coordinates 40. It is also contemplated that each of the adjusted-GPS-coordinates 40 may be given a distinct weighting based on a confidence-level associated with the distance 34 and the direction 36. For example, if the other-vehicle 22 is close to, especially directly in front of or direction behind the host-vehicle 12, then the adjusted-GPS-coordinate 40 for that vehicle may be given more weight than, for example, an instance of the other-vehicle 22 that is seventy-five meters (75m) away from the host-vehicle 12 and traveling in an on-coming lane.

It is contemplated that there may be instances when the GPS-coordinate from one of the other-vehicles 22 could be corrupted during transmission; have excessive error because of, for example, multipath signals from the satellites 18; or be in error due to malicious spoofing where one or more of the other-vehicles 22 deliberately broadcasts an erroneous value of the GPS-coordinate 26. Similarly, the distance 34 and/or the direction 36 may have a relatively large error for a variety of reasons, not limited to failure or intermittent operation of some aspect of the object-detector 32. To avoid corrupting of the host-coordinate 42, the controller 28 may be configured or programmed to reject 46 an instance of the adjusted-GPS-coordinate from the plurality of adjusted-GPS-coordinates 40 when the adjusted-GPS-coordinate in question differs from the receiver-coordinate 16 by greater than an error-threshold 48.

As a further safety action, the controller may be configured to operate the V2V-transceiver 24 to broadcast an identity of an other-vehicle 22 from which the adjusted-GPS-coordinate was rejected, and thereby report 50 an instance of excessive error or malicious spoofing so other-vehicles nearby can avoid using the GPS-coordinate being broadcast by the troubled other-vehicle.

While this invention has been described in terms of the preferred embodiments thereof, it is not intended to be so limited, but rather only to the extent set forth in the claims that follow.

I claim:

1. A navigation system for use on an automated vehicle, the system comprising:
   a global-positioning-system-receiver (GPS-receiver) that indicates a receiver-coordinate of a host-vehicle, wherein the receiver-coordinate is characterized by a receiver-error;
   a vehicle-to-vehicle-transceiver (V2V-transceiver) that receives a GPS-coordinate from each of a plurality of other-vehicles proximate to the host-vehicle;
   an object-detector that determines a distance and a direction relative to the host-vehicle to each of the plurality of other-vehicles; and
   a controller in communication with the GPS-receiver, the V2V-transceiver, and the object-detector, wherein the controller is configured to:
      adjust each of the GPS-coordinate from each of the plurality of other-vehicles based on the distance and the direction and thereby provide a plurality of adjusted-GPS-coordinates that coincide with the host-vehicle,
      combine the plurality of adjusted-GPS-coordinates with the receiver-coordinate to determine a host-coordinate that is characterized by a location-error less than the receiver-error,
      reject an adjusted-GPS-coordinate from the plurality of adjusted-GPS-coordinates when the adjusted-GPS-coordinate differs from the receiver-error of the receiver-coordinate by greater than an error-threshold, and
      operate the V2V-transceiver to broadcast and report an identity of an other-vehicle from which the adjusted-GPS-coordinate was rejected to the plurality of other-vehicles proximate to the host-vehicle for the navigation system for use on the automated vehicle.

2. The system in accordance with claim 1, wherein the object-detector includes one or more of a camera, a lidar, and a radar.

* * * * *